(12) United States Patent
Song et al.

(10) Patent No.: US 9,414,006 B2
(45) Date of Patent: Aug. 9, 2016

(54) SYSTEM FOR GENERATING RECOMMENDATION KEYWORD OF MULTIMEDIA CONTENTS AND METHOD THEREOF

(75) Inventors: In Jae Song, Bucheon-si (KR); Yu Won Kim, Seongnam-si (KR); Dong Wook Kim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 580 days.

(21) Appl. No.: 12/674,600

(22) PCT Filed: Aug. 29, 2008

(86) PCT No.: PCT/KR2008/005083
§ 371 (c)(1),
(2), (4) Date: Feb. 22, 2010

(87) PCT Pub. No.: WO2009/054610
PCT Pub. Date: Apr. 30, 2009

(65) Prior Publication Data
US 2011/0264682 A1    Oct. 27, 2011

(30) Foreign Application Priority Data

Oct. 24, 2007    (KR) .................. 10-2007-0107260

(51) Int. Cl.
*G06F 7/00*     (2006.01)
*G06F 17/30*    (2006.01)
*H04N 5/445*    (2011.01)
*H04N 5/76*     (2006.01)
*H04N 5/783*    (2006.01)
*H04N 7/173*    (2011.01)
(Continued)

(52) U.S. Cl.
CPC ...... *H04N 5/44513* (2013.01); *G06F 17/30781* (2013.01); *G06F 17/30828* (2013.01);
(Continued)

(58) Field of Classification Search
CPC .................................................. G06F 17/30828
USPC .......................................... 707/769, 999.005
See application file for complete search history.

(56) References Cited

U.S. PATENT DOCUMENTS

2005/0102259 A1*   5/2005   Kapur .................... 707/999.001
2005/0172318 A1*   8/2005   Dudkiewicz et al. .......... 725/46
(Continued)

FOREIGN PATENT DOCUMENTS

| JP | 11-161661 | 6/1999 |
| JP | 2000-250944 | 9/2000 |

(Continued)

OTHER PUBLICATIONS

Messer et al. "A Context Specific Search Facilitator for Home Entertainment Devices." (c) 2006, American Association for Artificial Intelligence. 7 pages.*

*Primary Examiner* — Charles Lu
(74) *Attorney, Agent, or Firm* — Greer Burns & Crain, Ltd.

(57) ABSTRACT

There is provided a system and method for providing a recommendation keyword having a high correlation with the content and reflecting the viewers' interests. A prospective viewer group of the content is generated by a broadcast time and a keyword of a specific broadcast content and a keyword set is generated by selecting keywords having a higher correlation with the content than a threshold value from among search words transmitted by the prospective viewer for a predetermined time period including a time before/after the broadcast time of the content. A keyword for each play time period is extracted from the keyword set by using the number of searches for each keyword therein for each play time period and the recommendation keyword for each play time period is stored, which is synchronized with play time of the content.

21 Claims, 9 Drawing Sheets

(51) Int. Cl.
*H04N 21/25* (2011.01)
*H04N 21/466* (2011.01)
*H04N 21/482* (2011.01)
*H04N 21/8405* (2011.01)
*H04N 9/82* (2006.01)

(52) U.S. Cl.
CPC ............. *H04N5/76* (2013.01); *H04N 5/783* (2013.01); *H04N 7/17318* (2013.01); *H04N 21/252* (2013.01); *H04N 21/466* (2013.01); *H04N 21/4668* (2013.01); *H04N 21/4828* (2013.01); *H04N 21/8405* (2013.01); *H04N 9/8205* (2013.01)

(56) References Cited

U.S. PATENT DOCUMENTS

| | | | |
|---|---|---|---|
| 2006/0004560 A1* | 1/2006 | Whitelock | 704/2 |
| 2006/0101503 A1* | 5/2006 | Venkataraman et al. | 725/136 |
| 2006/0117337 A1* | 6/2006 | Shivaji Rao et al. | 725/25 |
| 2006/0184515 A1* | 8/2006 | Goel et al. | 707/999.003 |
| 2007/0027864 A1* | 2/2007 | Collins et al. | 707/5 |
| 2007/0214154 A1* | 9/2007 | Ducatel et al. | 707/999.1 |
| 2007/0239713 A1* | 10/2007 | Leblang et al. | 707/999.006 |
| 2007/0282785 A1* | 12/2007 | Fayyad et al. | 707/1 |
| 2009/0049127 A1* | 2/2009 | Juan et al. | 709/204 |
| 2011/0040733 A1* | 2/2011 | Sercinoglu et al. | 707/688 |

FOREIGN PATENT DOCUMENTS

| | | |
|---|---|---|
| JP | 2002-335473 | 11/2002 |
| JP | 2007-110501 | 4/2007 |
| KR | 10-2002-0003915 | 1/2002 |
| KR | 10-2002-0025142 | 4/2002 |
| KR | 10-2002-0081767 | 10/2002 |
| KR | 10-2002-0088671 | 11/2002 |
| KR | 10-2003-0096362 | 12/2003 |
| KR | 10-2004-0101235 | 12/2004 |

* cited by examiner

X-FILE, MAIN CHARACTER OF X-FILE, ENDING OF X-FILE, ALIEN, UFO, DAVID DUCHOVNY, CAR IN X-FILE, FERRARI • • •

SYSTEM FOR GENERATING RECOMMENDATION KEYWORD OF MULTIMEDIA CONTENTS AND METHOD THEREOF

CROSS-REFERENCE TO RELATED APPLICATIONS

This application is the National Stage of International Application No. PCT/KR2008/005083, filed Aug. 29, 2008, and claims priority from and the benefit of Korean Patent Application No. 10-2007-0107260, filed on Oct. 24, 2007, which are both hereby incorporated by reference for all purposes as if fully set forth herein.

BACKGROUND OF THE INVENTION

1. Field of the Invention

The present invention relates to a system and a method for generating and providing a recommendation keyword relevant to multimedia content. More particularly, the present invention relates to a system and a method for providing a substantially reliable keyword collected from prospective viewers of content which is broadcasted during a specific time period as a recommendation keyword.

2. Discussion of the Background

Recently, as broadcasting technology becomes merged with data communication technology, various interactive broadcasting services such as video-on-demand (VOD) service, data broadcasting, T-commerce, IP TV and the like have been actively developed.

These interactive broadcasting services not only provide broadcasting content to users, but also reflect a viewer's demand by using a return channel so that it is possible to serve the viewer with the content selected directly by the viewer.

Meanwhile, as various internet services are merged with broadcasting, a searching service which is one of the most important internet services could be provided by a broadcasting receiving device. For example, the IP TV provides various existing IP-based services merged with the broadcasting as well as the broadcasting content by using an internet IP-based network.

Particularly, there is now a great demand for a content-relevant keyword search service which can immediately satisfy the viewers' curiosity about the broadcasting content.

FIG. 1 is a schematic view of a conventional system for searching complementary information relevant to content.

Korean Patent Laid-open Publication No. 2003-96362 discloses a configuration for providing a radio listener or a television viewer with complementary information relevant to a broadcasting program received in real-time.

The conventional system illustrated in FIG. 1 includes a broadcasting receiving device 10, a user device 11, a broadcasting station 21, a channel information server 22 and a web server 23.

The broadcasting receiving device 10 receives broadcasting content transmitted from the broadcasting station 21.

The channel information server 22 provides a URL for complementary information according to each broadcasting content broadcasted from the broadcasting station 21. If the viewer wants to search the complementary information about the content presently broadcasted, he/she requests the URL for the complementary information from the channel information server 22 by using the user device 11.

The channel information server 22 transmits the URL classified by a subject of a channel or a broadcasting program to the user device 11 and the user device 11 searches the complementary information from the web server 23 by using the URL classified by the subject.

Meanwhile, Korean Patent Laid-open Publication No. 2002-81767 discloses a technology providing information about entertainers and goods based on an electronic program guide (EPG) by using a DB in which this information on a presently broadcasted program is previously stored.

Further, Korean Patent Laid-open Publication No. 2004-101235 discloses a technology for displaying a broadcasting program together with information about the program being broadcasted on television by using a web site including such information.

However, even though, in these conventional technologies, it is premised that information relevant to the program has been previously stored, there has been not provided a method of how a keyword or a subject about the information relevant to the program is collected.

Therefore, in the conventional technologies, there is no other choice but to manually collect and provide the complementary information or relevant information on the broadcasting program content by an administrator. However, in this case, it is actually impossible to provide the information highly relevant to various broadcasting contents. In addition, even if there may be various search keywords for a specific content, there is a limit to setting the various search keywords manually. Further, there is a very rare possibility that the relevant information selected by the administrator is identical with the information the viewer wants to search, and the amount of information provided to the viewer is also very restricted to the previously prepared data.

As stated above, there occurs a problem that the technology for synchronizing and providing the keywords or information relevant to the content by manually preparing them in advance together with the broadcasting program may not satisfy the viewers' interests.

Accordingly, the above-described conventional technologies have a problem in that they do not disclose a method for providing a content relevant keyword having a high correlation with the content and reflecting the viewers' interests.

SUMMARY OF THE INVENTION

In order to solve the above-stated problem, the present disclosure provides a system and a method for providing a content relevant keyword reflecting a viewer's interest.

Further, the present disclosure provides a system and a method capable of recommending various keywords having a high correlation with the content.

In addition, the present disclosure provides a system and a method for providing a recommendation keyword having the high correlation with the content and reflecting a viewer's interest for each play time period of content.

Furthermore, the present disclosure provides a system and a method for storing a recommendation keyword for each content compatible with various applications of the content in a database.

To solve the above-stated technical problem, in accordance with a first aspect of the present invention, there is provided a system for generating a recommendation keyword, the system including: a seed keyword DB for storing a predetermined seed keyword relevant to a content and a broadcast time of the content; a prospective viewer classifying unit for classifying a prospective viewer of the content from among users who transmitted search words to a search engine by using the broadcast time and the seed keyword; and a recommendation keyword generating unit for generating a keyword set by selecting keywords having a higher correlation with the content than a threshold value from among the search words transmitted by the prospective viewer based on a user ID of the prospective viewer and the broadcast time.

Further, the recommendation keyword providing system may further include: a content-keyword time synchronizing unit for generating a recommendation keyword for each play time period of the content based on the number of searches for the keywords included in the keyword set for each broadcast time period.

Furthermore, the prospective viewer classifying unit can classify a user as the prospective viewer when the user inputs the seed keyword a predetermined number of times or more for a preset time period including the broadcast time.

Furthermore, the recommendation keyword generating unit can generate the keyword set by using a ratio of the number of searches for a specific keyword by the prospective viewer to the total number of searches for all keywords by the prospective viewer.

Further, in accordance with a second aspect of the present invention, there is provided a method for generating a recommendation keyword, the method including: a) classifying a prospective viewer of a content by using previously stored seed keywords in relation to the content and a broadcast time of the content; and b) generating a recommendation keyword set by selecting keywords having a higher correlation with the content than a threshold value from among search words transmitted by the prospective viewer for a predetermined time period including the broadcast time of the content.

Furthermore, in step b), the keyword set can be generated by using a ratio of the number of searches for a specific keyword of the prospective viewer to that of the non-prospective viewer.

Further, in step b), the keyword set can be generated by further using the number of the prospective viewers who searched the specific keyword or in step b), the keyword set can be generated by further using a ratio of the number of searches for the keyword for a predetermined time period including the broadcast time.

Further, in accordance with a third aspect of the present invention, there is provided a storage medium in which a data structure is stored, the data structure including: a content identifying data for identifying a content; an identifying data for each play time period, which is the content's total play time divided by a predetermined value; and at least one keyword data for each play time period corresponding to the identifying data for each play time period, wherein the keyword data for each play time period is provided by synchronizing that with a play time of the content.

In accordance with the above-described technical solution, it is possible to provide a recommendation keyword having a high correlation with content and reflecting a viewer's interest.

Further, in accordance with the present invention, it is possible to store a recommendation keyword for each content in a database or provide it in file format so as to be compatible with application services of various contents by providing the recommendation keyword having the high correlation with the content and reflecting the viewer's interest for each play time period of content.

DETAILED DESCRIPTION OF THE ILLUSTRATED EMBODIMENTS

Figure 1:
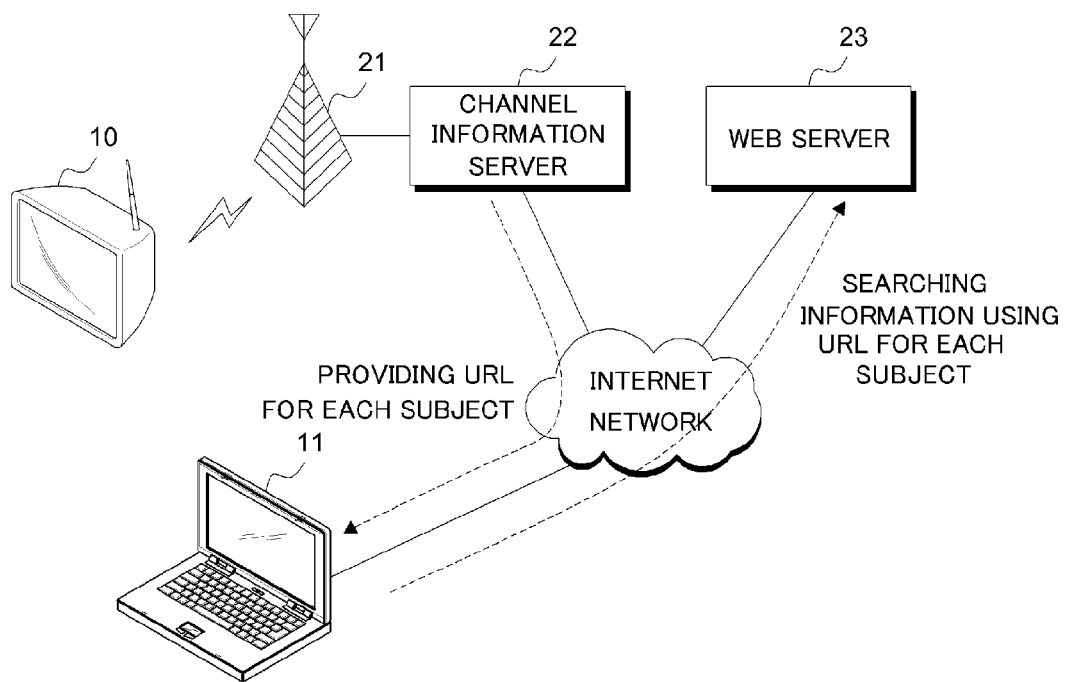
FIG. 1 is a schematic view of a conventional system for searching complementary information relevant to content.

Hereinafter, embodiments of the present invention will be described in detail with reference to the accompanying drawings so that the present invention may be readily implemented by those skilled in the art. However, it is to be noted that the present invention is not limited to the embodiments but can be realized in various other ways. In the drawings, parts irrelevant to the description are omitted for the simplicity of explanation, and like reference numerals denote like parts through the whole document.

Through the whole document, the term "connected to" or " coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

The term "search word" used in this document indicates a word or a combination of words inputted by a user through a search engine.

Further, the term "keyword" used in this document means a word or a combination of words likely to be relevant to a specific content.

Therefore, the "keyword" can be selected from the already-inputted "search words."

Figure 2:
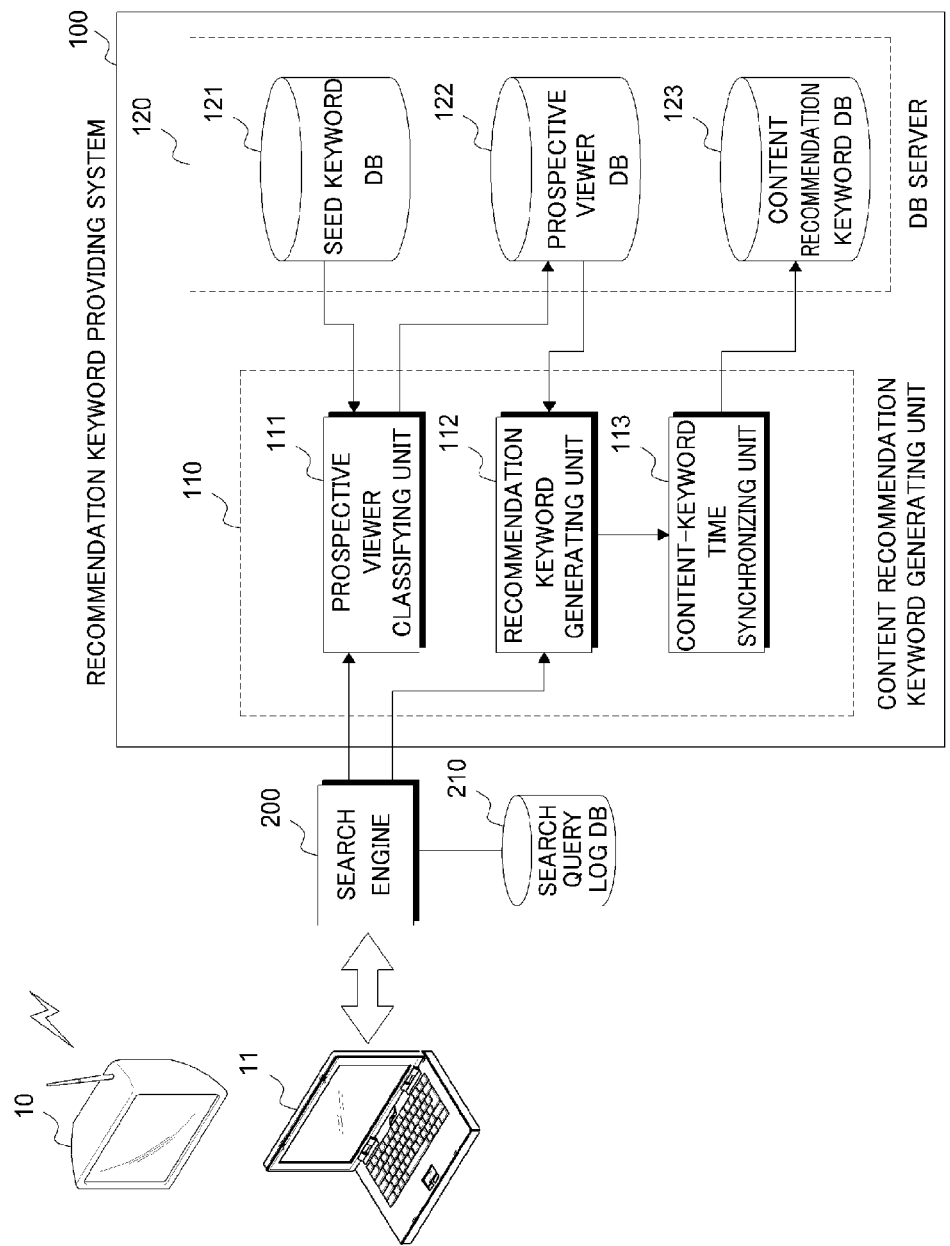
FIG. 2 is a block diagram of a system for providing a recommendation keyword in accordance with an embodiment of the present invention.

FIG. 2 is a block diagram of a system for providing a recommendation keyword in accordance with an embodiment of the present invention.

The recommendation keyword providing system 100 roughly includes a content recommendation keyword generating unit 110 and a DB server 120.

The content recommendation keyword generating unit 110 includes a prospective viewer classifying unit 111, a recommendation keyword generating unit 112, and a content-keyword time synchronizing unit 113. The DB server 120 includes a seed keyword DB 121, a prospective viewer DB 122 and a content recommendation keyword DB 123.

The recommendation keyword providing system 100 can perform an operation in cooperation with a typical search engine 200. The recommendation keyword providing system 100 in accordance with the embodiment of the present invention is capable of practically using information of a search query log DB 210 in which a search query log transmitted to the search engine 200 is stored.

Hereinafter, there will be explained in detail an operation of each component and a relationship with each other.

If a broadcasting program is broadcasted through a broadcasting receiving device 10, keyword searches for the broadcasting program are concentratedly made in a user device 11 from a time before the broadcast time to a time after the broadcast time according to statistics.

Such a search query is received by the search engine 200 and a typical search service system stores a search keyword, a search time and a user ID in the search query log DB 210.

In this case, the user ID can be, for example, a Bcookie. The Bcookie is a kind of ID assigned to the user device 11 and is also a serial number assigned based on, e.g., an IP address and a session value of browser or the like when a user accesses a search page through the user device 11 regardless of a member registration or a member login. If the Bcookie is not deleted by the user, it can be used again when the user revisits the search page. Therefore, the Bcookie can be used for identifying the user device 11 as a serial number assigned to a single PC.

Hereinafter, the embodiment of the present invention will be explained and a value for identifying the user such as a Bcookie will be referred to as a "user ID".

The prospective viewer classifying unit 111 can perform an operation in cooperation with the search engine 200 and the seed keyword DB 121.

Stored in the seed keyword DB 121 is basic keywords relevant to a specific broadcasting program, i.e., seed keywords corresponding to a content name and a broadcast time. For example, information on a content program name (the number of times, subtitle) and a broadcast date can be stored together with seed keywords corresponding thereto. In this case, the seed keywords can include a name of the broadcasting content or a modified name. Meanwhile, the seed keywords can be classified by each category and each category can be assigned with a different weight value. For example, among drama categories, a first category may include a title and a name of a cast, and a second category may include an actor/actress name and producers. In this case, the first category having a higher search frequency may be assigned with a higher weight value than the second category.

The prospective viewer classifying unit 111 examines whether or not any one of the search words received by the search engine 200 during a predetermined time period ranging from a time before the broadcast time to a time after the broadcast time corresponds to one of the seed keywords stored in the seed keyword DB 121, and reads IDs of the users who inputted the seed keywords from, e.g., the Bcookies or the like. The read user IDs can be classified as prospective viewers. At this time, in order to classify user IDs as prospective viewers, it is determined whether or not an access is normal and then, IDs of the users who inputted the seed keywords a preset number of times or more can be classified as the prospective viewers. Here, if the search engine provides an auto-completion function on a search window, users who inputted search words obtained by using the auto-completion function may be included in prospective viewers but users who inputted already-provided words (e.g., popular search word, recommendation search word) on a screen of the search engine site can be excluded from the prospective viewers.

When the prospective viewers are classified, the user IDs of the prospective viewers are stored in the prospective viewer DB 122. Stored in the prospective viewer DB 122 is the user IDs matched with a specific broadcasting content, or a series or a group of the specific broadcasting content.

The recommendation keyword generating unit 112 collects search words transmitted from the prospective viewers during the broadcast time period of a relevant content with reference to the prospective viewer DB 122. Further, if the collected search words satisfy a specific condition, the recommendation keyword generating unit 112 classifies the search words as keywords and adds the keywords to a keyword set. The above-stated specific condition may require that, for example, the keywords relevant to the content have a higher correlation than a threshold value.

For example, a ratio of the number of searches for the relevant keywords of the prospective viewer during the broadcast time can be considered as the following specific condition. That is, it may be a condition that the number of the users searching the relevant keywords should be not less than a preset value or the number of searches for the relevant keywords should be concentrated on a specific time period (e.g., a broadcast time of the relevant content).

The recommendation keyword generating unit 112 classifies the keywords satisfying the above-stated condition as recommendation keywords for the relevant content and generates a keyword set for the relevant content.

The content-keyword time synchronizing unit 113 performs a function of matching keywords included in the keyword set with each play time period of content. For example, the number of searches for the keywords for each play time period of content is measured every 60 (sixty) seconds and selects a keyword having a high ratio of the number of searches for each time period. In this case, a preset keyword which is inappropriate is not included. For example, inappropriate keywords such as "a live broadcast", "a rebroadcast", "a review', "programming", "a broadcast time" and the like are deleted. The search query log DB 210 further includes information on a search time for the keyword selected as the recommendation keyword. Therefore, if a broadcast start time of the content is combined with the search time for the keyword, it is possible to synchronize the play time period of the content and the search time for the keyword.

Finally, the keywords matched with each content are stored in the content recommendation keyword DB 123. The content recommendation keyword DB 123 stores the recommendation keywords synchronized with each play time period of content. Accordingly, if a specific content is provided through various services, data stored in the content recommendation keyword DB 123 can be provided together in a separate file. In this case, the viewer can use the recommendation keywords synchronized with each play time period of content as well as enjoy watching the content by using the file.

Figure 3:
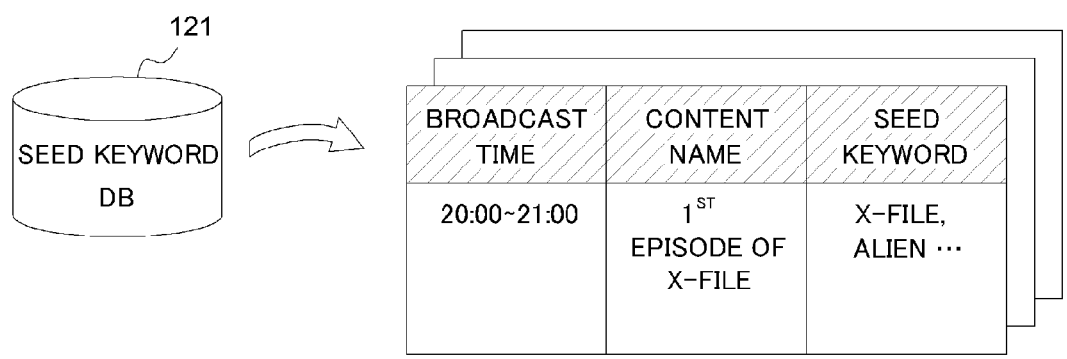
FIG. 3 provides a view of a data structure stored in a seed keyword DB 121 in accordance with an embodiment of the present invention.

FIG. 3 provides a view to show a data structure stored in the seed keyword DB 121 in accordance with an embodiment of the present invention.

The seed keyword DB 121 stores a broadcast time corresponding to each content and seed keywords. For example, the seed keyword DB 121 stores a broadcast time of the first episode of X-file and most basic keywords, e.g., "X-file", "an alien" or the like as the seed keywords.

As stated above, the keywords relevant to a specific content is increasingly searched during a time period ranging from a time before the broadcast time to a time after the broadcast time so that users who searched the seed keywords during the predetermined time period ranging from a time before the broadcast time to a time after the broadcast time of the first episode of X-file is determined as prospective viewers who is watching the first episode of X-file.

As stated above, if seed keywords are set for each broadcasting content, it is possible to collect candidates for prospective viewers of each content in accordance with the embodiment of the present invention.

Figure 4:
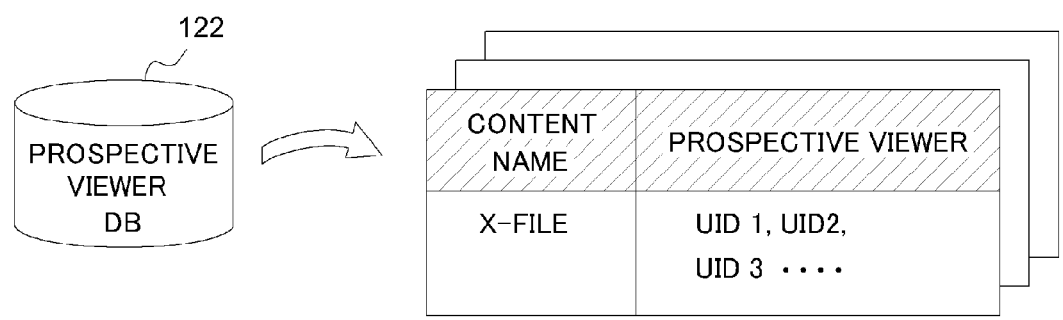
FIG. 4 is a view of a data structure stored in a prospective viewer DB 122 in accordance with the present invention.

FIG. 4 is a view of a data structure stored in the prospective viewer DB 122 in accordance with the present invention.

Through the above-stated procedure, if the prospective viewers are classified, user IDs (UID 1, UID 2, UID 3) of respective prospective viewers are matched with relevant content and then stored in the prospective viewer DB 122. Therefore, in the future, search words transmitted from the prospective viewers during a broadcast time of the same kind of content can be regarded as a candidate for a recommendation keyword corresponding to the content.

Figure 5:
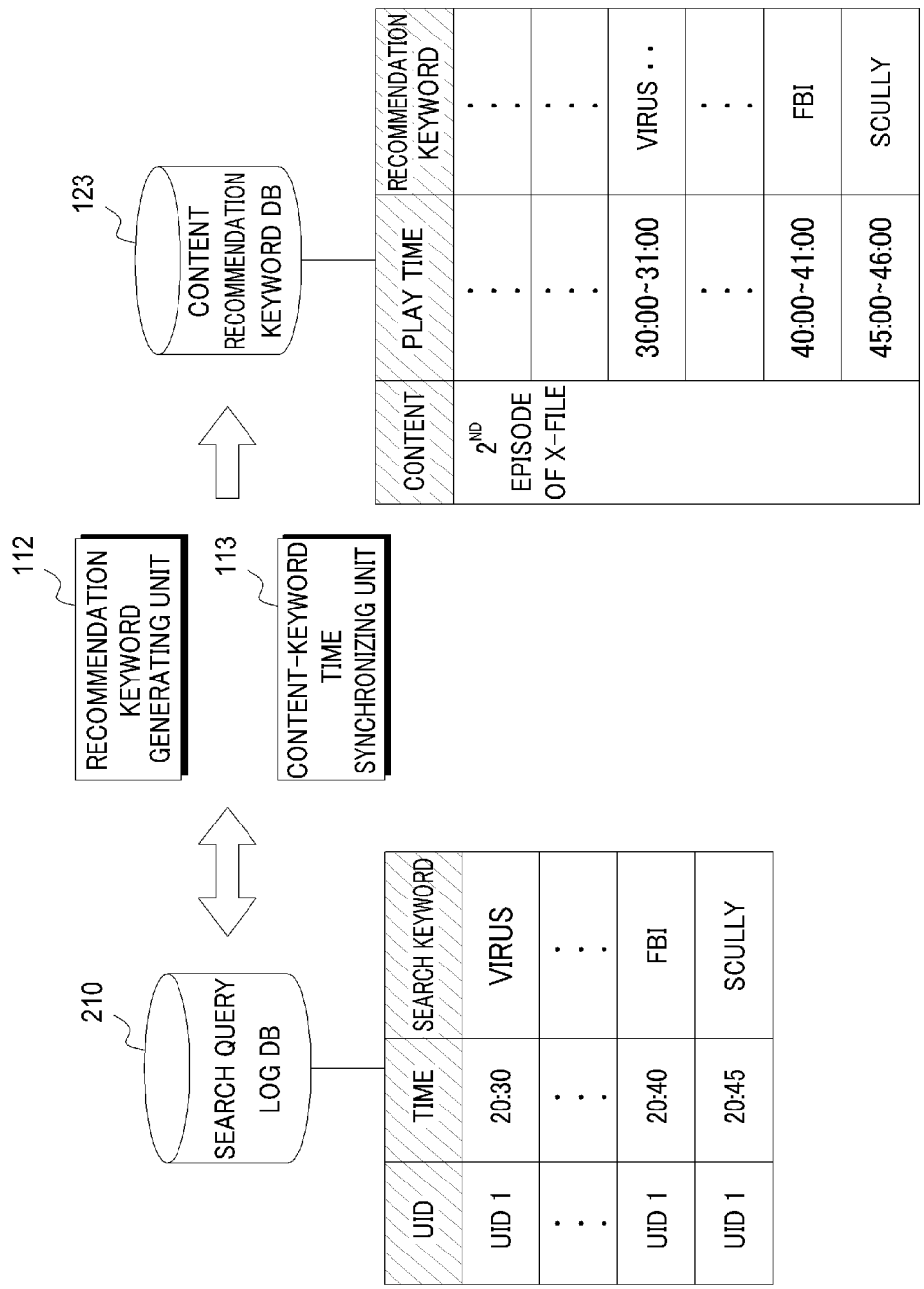
FIG. 5 is a view of a data structure of a content recommendation keyword DB 123 and a procedure of generating the same in accordance with an embodiment of the present invention.

FIG. 5 is a view of a data structure of the content recommendation keyword DB 123 and a procedure of generating the same in accordance with an embodiment of the present invention.

Since it is possible to anticipate the prospective viewers of the content by using the user IDs for respective content stored in the prospective viewer DB 122, recommendation keywords can be generated by analyzing the search query log stored in the search query log DB 210.

The search query log DB 210 stores a user ID regarding a search query received by a search engine, a search time and a log including a search keyword so that it is possible to read a search keyword and a search time of the prospective viewer.

For example, a prospective viewer UID 1 performs keyword searches for "a virus", "FBI" and "Scully" during a broadcast time of "the second episode of X-file" and if these keywords are included in a recommendation keyword set by satisfying a specific condition, the keywords can be stored in the content recommendation keyword DB 123.

For example, "the second episode of X-file" is started at 20 o'clock and if "the virus" is searched at 20:30, "FBI" at 20:40, and "Scully" at 20:45, these keywords can be selected as one of the recommendation keywords for respective reproduction time periods of 30 to 31 minutes, 40 to 41 minutes and 45 to 46 minutes.

In view of the foregoing, if the content recommendation keyword DB 123 stores recommendation keywords for each play time period of the relevant content, it is possible to provide various recommendation keywords reflecting a user's interest in each content through a communication-broadcasting convergence service such as an IPTV, a web TV or the like. The above-stated keywords can be used to make it easy for a user to select wanted search words under the circumstance that it is inconvenient to input characters (e.g., in case of using a remote controller as an input device), or can be used for the auto-complete function performed when a part of the search word is inputted.

It may be easily understood by those skilled in the art that each component of the above-stated recommendation keyword providing system can be embodied separately and also can be embodied integrally in hardware. Further, the embodiment of the present invention can be integrally realized as a part of component of the search engine 200 capable for providing recommendation keywords.

Figure 6:
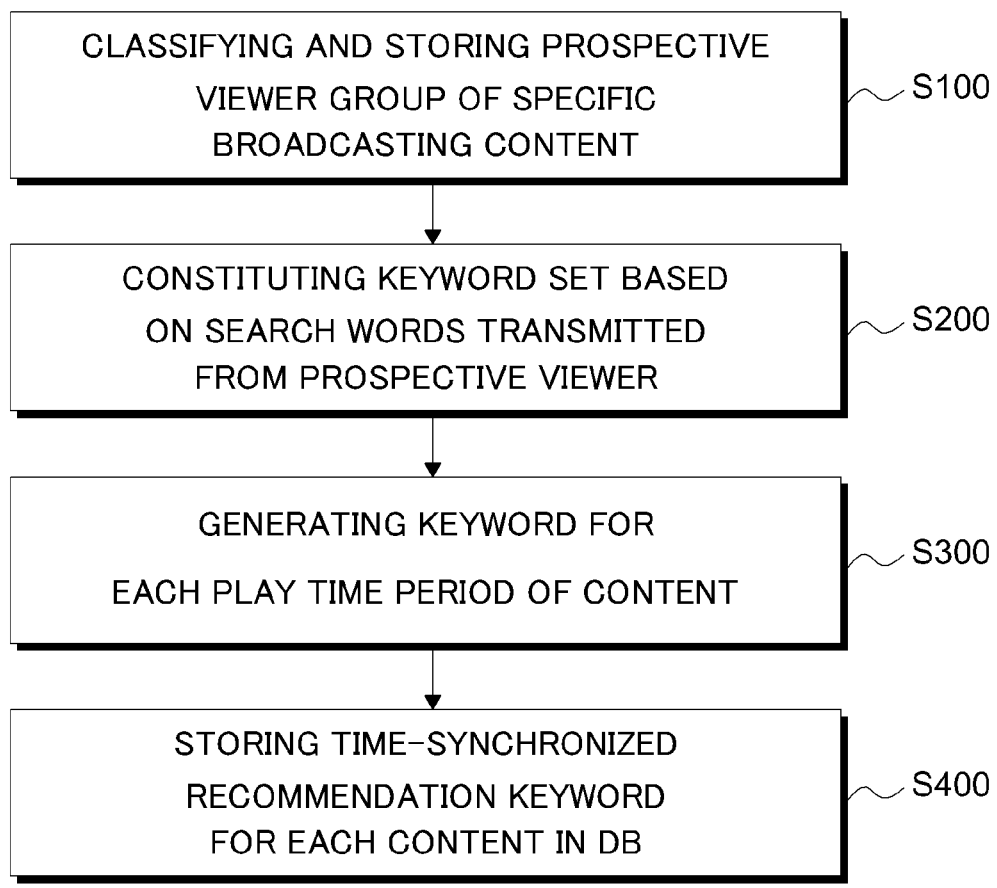
FIG. 6 provides a flow chart showing a method for generating a recommendation keyword in accordance with an embodiment of the present invention.

FIG. 6 provides a flow chart to show a method for generating a recommendation keyword in accordance with an embodiment of the present invention.

In a method of generating the recommendation keyword in accordance with the embodiment of the present invention, a prospective viewer group of a specific broadcasting content should be classified first and then the prospective viewer group corresponding to its relevant broadcasting content is stored (step S100).

Once the prospective viewers are classified, a keyword set is generated based on search words transmitted from the prospective viewer (step S200). It may be possible to generate the keyword set from search words satisfying a specific condition that a correlation with the relevant content is determined to be high among the search words transmitted from the prospective viewers during a broadcast time of the same broadcasting content or a series of the same content.

After generating the keyword set, keywords for each play time period of the content are generated (step S300). By using a search time for search words included in the keyword set, it is possible to determine during which time period within the broadcasting content play time each search word is inputted. Therefore, the recommendation keywords included in the keyword set can be matched with respective play time periods of the content.

In step S400, the time-synchronized recommendation keywords for each content are stored in a database. The recommendation keywords stored in the database can be provided in a separate file or provided by a specific server after being synchronized with the content.

Hereinafter, steps S100, S200, S300 and S400 illustrated in FIG. 6 will be explained in more detail.

Figure 7:
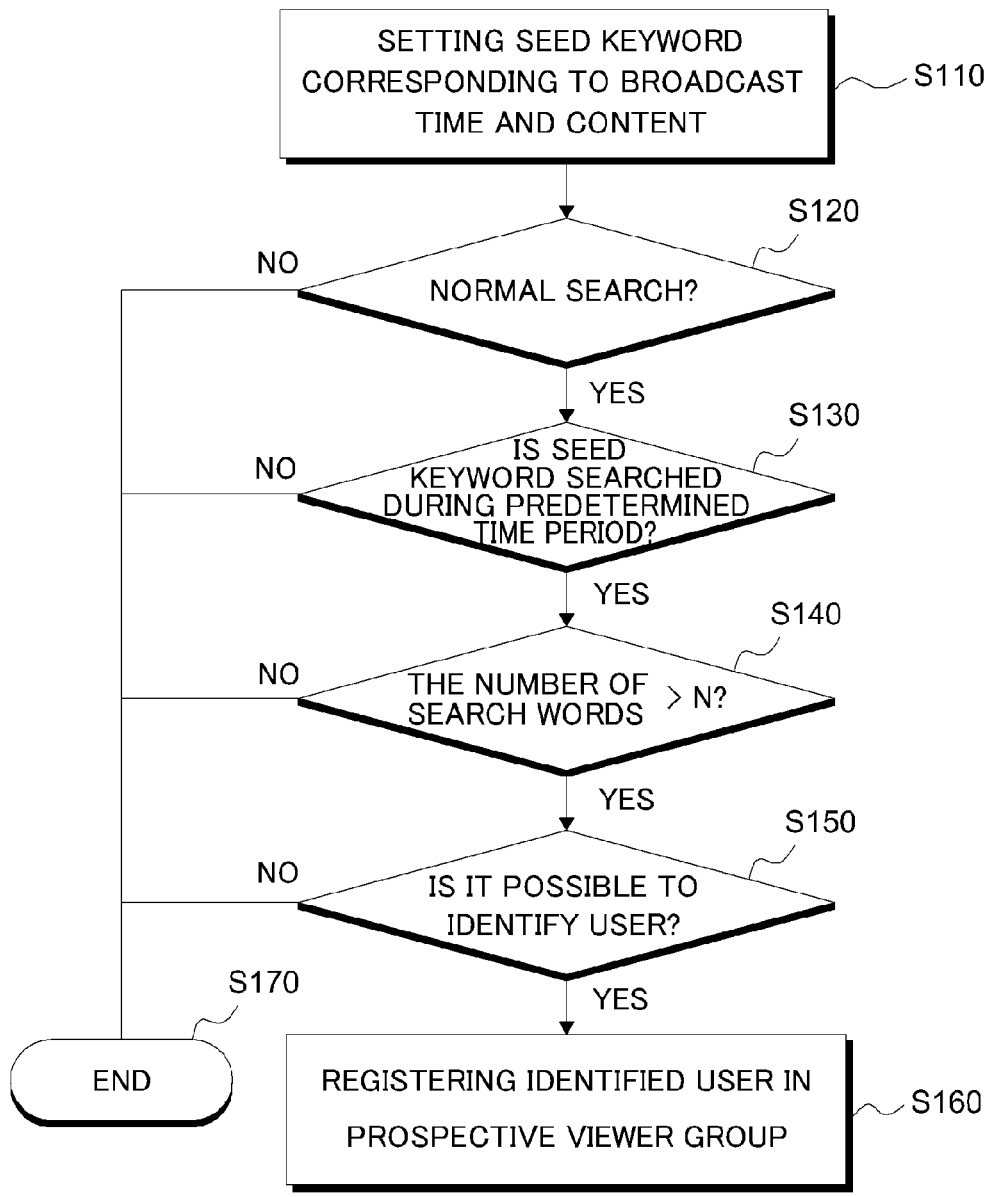
FIG. 7 provides a more detailed flow chart showing a method for classifying and storing a prospective viewer group in accordance with an embodiment of the present invention.

FIG. 7 provides a more detailed flow chart showing a method for classifying and storing a prospective viewer group in accordance with an embodiment of the present invention.

In order to classify the prospective viewer, first of all, a seed keyword relevant to a content corresponding to a broadcast time is inputted (step S110). The seed keyword can be a most basic keyword group representing the content. The seed keyword can include, for example, a content name, an actor, a subject and the like. The broadcast time includes information on broadcasting time of the content and may also include date information. Further, the broadcast time may include a predetermined time period including a specific time (e.g., 30 minutes) before and after the broadcast time.

In step S120, it is determined whether or not a search made during the broadcast time or a predetermined time period is normal. If there is made any abnormal search such as a case where a browser is closed before search results are transmitted, or the like, a process is ended (step S170) and such an abnormal search is not considered in a procedure of classifying the prospective viewers. The determination of whether or not the search is normal can be made with reference to a variable value with which it is determined whether or not a browser normally accesses a search result page. In addition, if a search is made by using an already-completed search word on a page provided by the search engine, it is not considered when classifying the prospective viewer.

In step S130, it is determined whether or not a seed keyword is searched during a predetermined time period ranging from a time before the broadcast time to a time after the broadcast time. If a specific user searches the seed keyword, the process goes to the next step.

If the seed keyword is searched, it is determined whether or not the number of the search words transmitted by a user who transmitted the seed keywords is more than the threshold value n, and if the number of the search words exceeds the threshold value n, the process goes to the next step so as to register the user as a prospective viewer (step S140).

Finally, it is determined whether or not an ID of the user to be registered as the prospective viewer can be identified (step S150). For example, if a value of the Bcookie is "—," it is deemed that there is no Bcookie and it is impossible to identify the user.

Meanwhile, even though not illustrated in FIG. 7, if one user inputs a search word too many times or too often during a broadcast time, it is desirable to exclude the user from the prospective viewer.

Further, as stated above, in case that a weight value is assigned to each category by which the searched seed keywords are classified, if the total of the weight values assigned to the respective categories is not less than a preset value, it may be possible to classify the user as the prospective viewer. In accordance with the embodiment, it is possible to exclude a user performing a search irrelevant to a content from the prospective viewer by assigning a low weight value to a seed keyword corresponding to an actor/actress who is double cast at different content or becomes an issue regardless of the content. For example, if an actor/actress who is casted at plural contents or becomes an issue in relation with a social issue irrelevant to the content happens to be identical with the performer of the content, the seed keyword for such an actor/actress is assigned with a low weight value in order to prevent classifying the user who does not watch the presently-broadcasted content as the prospective viewer.

If the above-stated determination procedure is satisfied, a user who inputted keywords relevant to the content while watching the broadcast content is classified as the prospective viewer and an ID of the classified user is registered in the prospective viewer group (step S160). The user ID of the prospective viewer group is used later for identifying a viewer of the same content or a series thereof.

Figure 8:
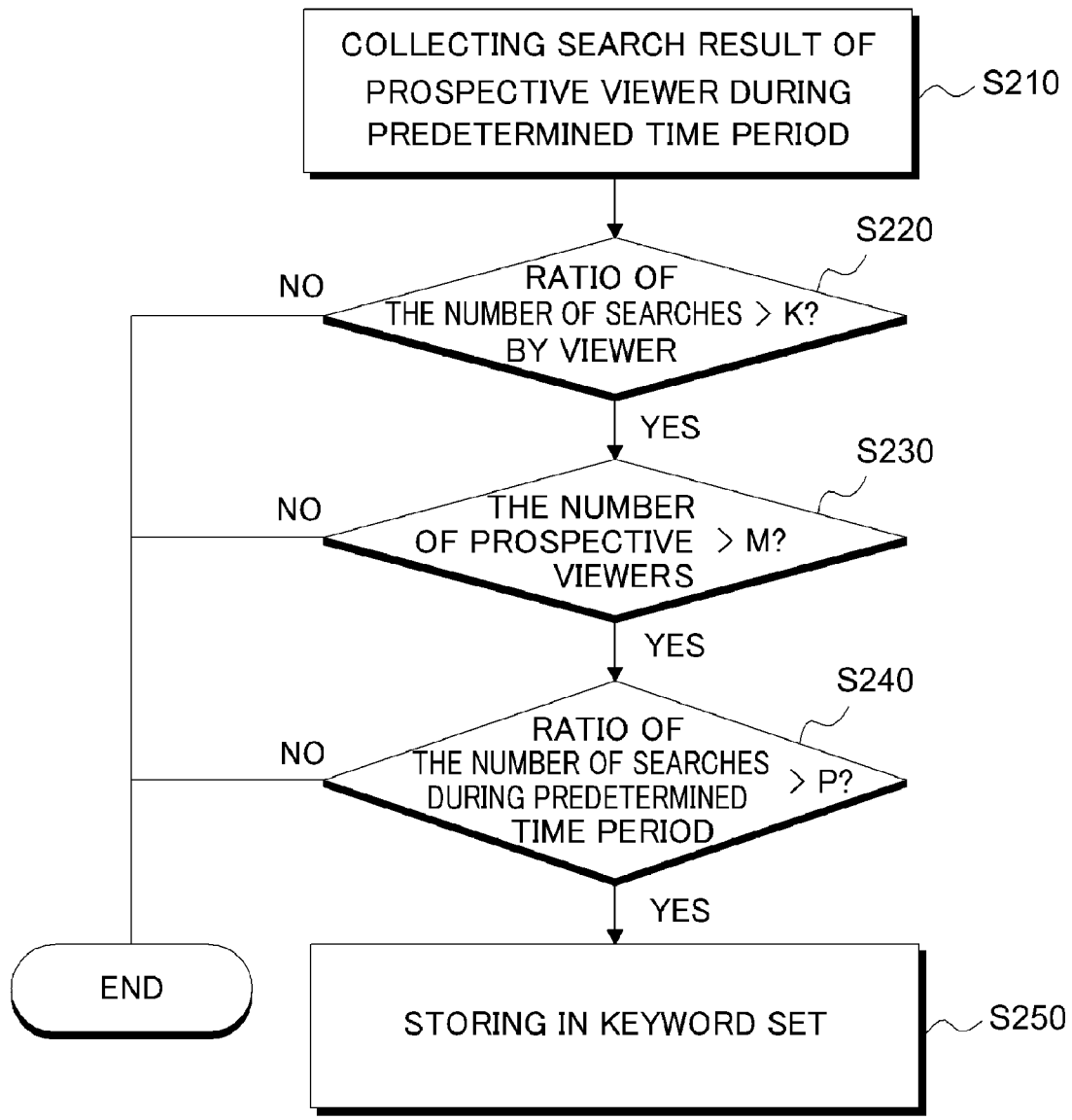
FIG. 8 provides a detailed flow chart showing a method for generating a keyword set in accordance with an embodiment of the present invention.

FIG. 8 provides a detailed flow chart showing a method for generating a keyword set in accordance with an embodiment of the present invention.

Once the prospective viewer group corresponding to the content is generated, recommendation keywords for the respective content are collected by using the search results of the prospective viewers.

In step S210, the results of the searches made by the prospective viewers during a predetermined time period are collected. For example, the predetermined time period may include 30 minutes before and after a broadcast time of a specific content. In this step, it is determined whether or not each of the search words transmitted from the prospective viewers can be recommendation keywords for the relevant content.

In step S220, it is determined whether or not a ratio of the number of searches for the relevant keyword inputted by the prospective viewer is higher than a threshold value K. Here, the ratio of the number of searches of the prospective viewer can be determined by the following Equation 1.

[Equation 1]

$$(QC\,A/QC\,A\text{-total})/(QC\,B/QC\,B\text{-total}) > K \text{ (here, } K>0)$$

In this equation, each parameter has its own meaning as follows.

QC A: Number of searches for relevant keywords of a prospective viewer

QC A-total: Total number of searches for search words of a prospective viewer

QC B: Number of searches for relevant keywords of a non-prospective viewer

QC B-total: Total number of searches for search words of a non-prospective viewer That is, if a ratio of the number of searches for a specific keyword inputted by the prospective viewer is higher than that of searches for a specific keyword inputted by the non-prospective viewer, it can be deemed that the relevant keyword has a high correlation with the content.

In step S230, it is determined whether or not the number of the prospective viewer which inputted the relevant keyword is higher than a threshold value m. That is, the next step is followed only if the relevant keyword is searched by the number of prospective viewers which is not less than the threshold value m.

Meanwhile, the search words transmitted from the prospective viewers can be included in the keyword set only if the prospective viewers are classified by searching a predetermined number of seed keywords or more, because the search words transmitted from the prospective viewers classified by searching only one seed keyword can be different search words just including the same spelling as that of the seed keyword.

For example, in case one of the seed keywords is "file", a user searching "profile" can be classified as a prospective viewer as well. Therefore, it is desirable to exclude the search words transmitted from the prospective viewer classified by searching only one seed keyword such as "file" from the keyword set.

In step S240, it is determined whether or not a ratio of the number of searches made for a predetermined time period including a broadcast time of the relevant keyword (i.e., number of searches made during a specific time period/number of searches made for a day) is higher than a threshold value P (here, 0<P<1). If the ratio of the number of searches for the relevant keyword during the predetermined time period is higher than the threshold value P, it can be deemed that the relevant keyword is concentratedly searched during the broadcast time.

If the above conditions are satisfied, the relevant keyword is added to a keyword set as a recommendation keyword for the content (step S250).

The above-stated steps S220, S230 and S240 can be sufficiently performed by using information stored in the seed keyword DB 120, prospective viewer DB 122 and search query log DB 210, as already-explained.

Further, since the equation or the condition mentioned in steps S220, S230 and S240 is just an example, it is possible to use other conditions so as to obtain a correlation between a keyword and a content by using the number of searches, the number of searchers, a search time or the like.

Figure 9:
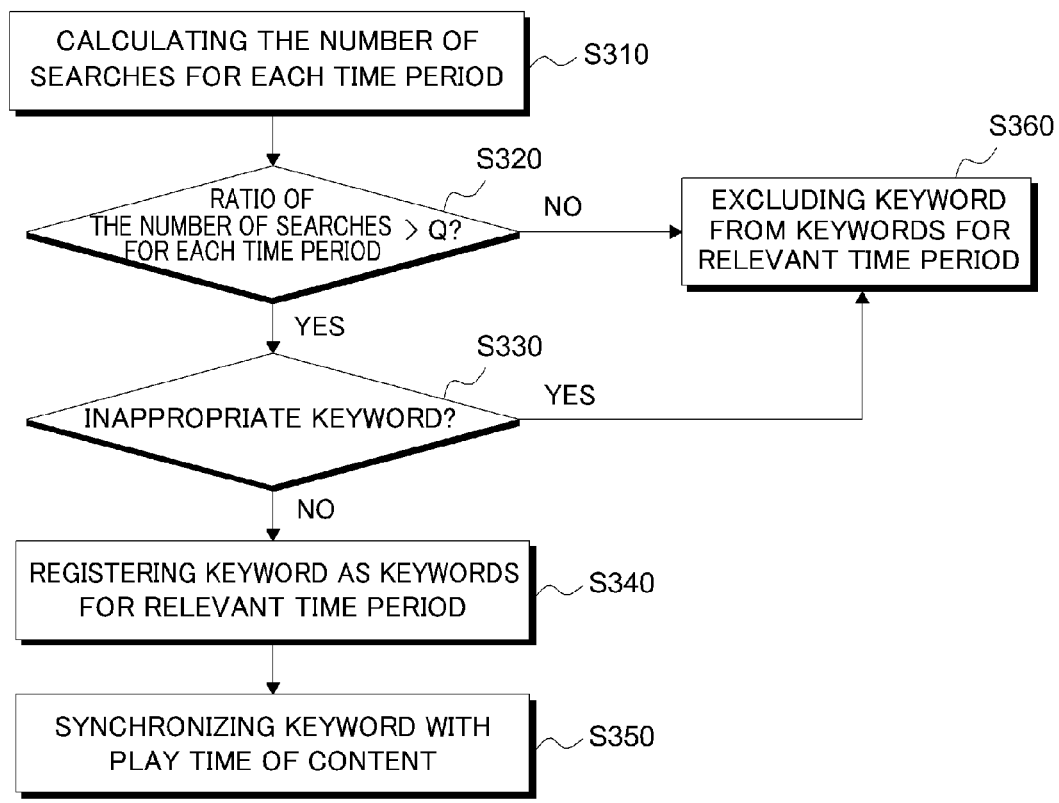
FIG. 9 provides a detailed flow chart showing a method for generating a recommendation keyword for each play time period of content in accordance with an embodiment of the present invention.

FIG. 9 provides a detailed flow chart showing a method for generating a recommendation keyword for each play time period of content in accordance with an embodiment of the present invention.

As stated above, if the recommendation keywords set for the specific content is generated, the keyword itself is sufficiently useful, but if it is synchronized for each play time period of content, the user's convenience can be maximized.

In step S310, the number of searches for each time period is calculated. That is, the number of searches for the relevant keyword is obtained by dividing the time in which the keyword is searched into specific time periods (e.g., 60 seconds).

By calculating a ratio of the number of searches for the relevant keyword for each time period (i.e., the number of searches made for each time period/the number of searches made during a broadcast time), it is determined whether or not such a ratio is higher than a threshold value Q (step S320). In this case, it is possible to substitute the number of searches made during the broadcast time with the number of searches made during the broadcast time+A (A>0). If the ratio is not higher than the threshold value Q, recommendation keywords is excluded from the keyword for the relevant time period (step S360), and if the ratio is higher than the threshold value Q, the next step follows.

In this step, it is also possible to select a predetermined number of keywords as recommendation keywords for each time period in descending order of a ratio of the number of searches for each time period, instead of using the threshold value Q.

In step S330, it is determined whether or not the relevant keyword is inappropriate. Here, an inappropriate keyword means a preset keyword irrelevant to the content such as "a live broadcast", "a rebroadcast", "a review" or the like.

In step S340, a keyword which has a high ratio of the number of searches for each time period but is not inappropriate is registered as a recommendation keyword for each time period.

When the recommendation keywords for all the time periods are registered, the broadcast time of the content is synchronized with the play time of the content (step S350). The recommendation keyword selected for each time period from the broadcast start time is matched with the content as the recommendation keyword for each time period from the play start time.

Figure 10:
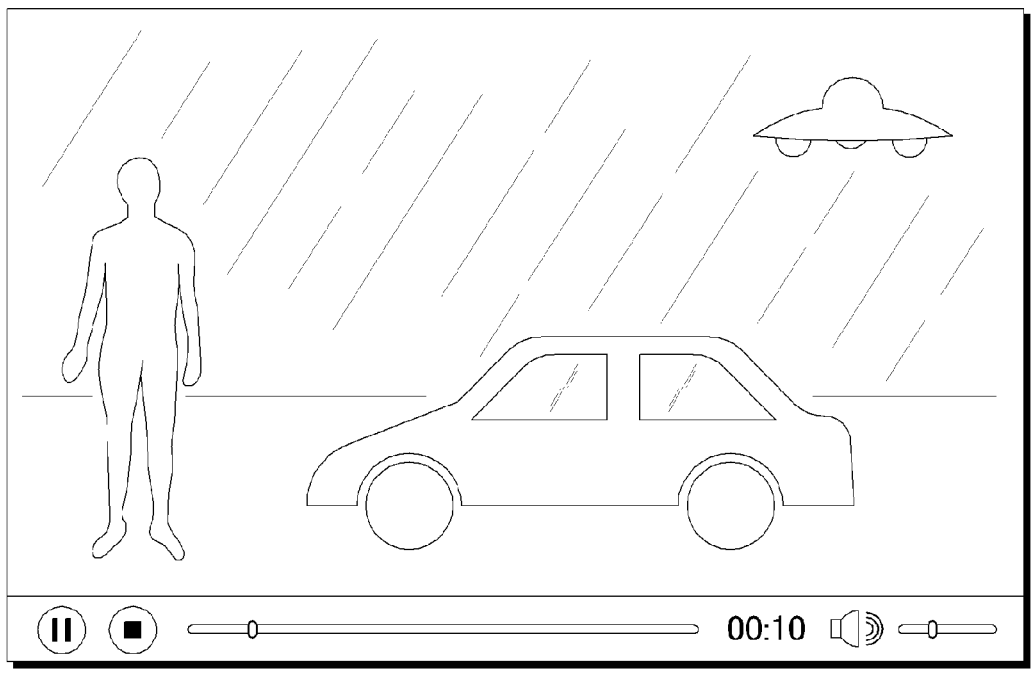
FIG. 10 is a view of a screen on which a recommendation keyword is practically used in accordance with an embodiment of the present invention.
Figure 10:

FIG. 10 is a view of a screen on which a recommendation keyword is practically used in accordance with an embodiment of the present invention.

FIG. 10 illustrates a view of the screen at 10 minutes after the start time of playing a specific content (e.g., X-file). On the screen, there are displayed a person corresponding to a main character, a car in which the main character boards, an UFO and the like.

Recommendation keywords corresponding to the displayed content can be, e.g., "X-file", "a main character of X-file", "ending of X-file", "an alien", "an UFO", "David Duchovny" (a real name of the main character of X-file), "a car in X-file", "Ferrari" (a car of the main character), or the like. These recommendation keywords can be provided on the screen or in other means upon the user's request.

The above-stated keywords can be used as a keyword for search in a service provided together with an internet search such as an IP TV. In this case, it is possible to easily perform a search by selecting his/her wanted keyword even under the circumstance that it is inconvenient to input characters.

In addition, it is possible to use the above-stated recommendation keywords for search in the circumstance of a web TV in which an internet communication can be immediately used. Further, if the recommendation keyword file is synchronized with a multi-media file of the content, it is possible to provide the recommendation keywords to various multi-media services.

Furthermore, it is possible to commercially use the recommendation keywords by assigning data concerning specific information or an advertisement thereto. Further, it is possible to maximize the convenience of the user who requests various kinds of information by providing search results through a plurality search engines in response to a single keyword.

As stated above, a system and a method for providing recommendation keywords in accordance with the embodiment of the present invention can be variously provided to any service in that the recommendation keywords have the high correlations with the content and can reflect the viewers' interests.

The embodiment of the present invention can be embodied in a storage medium including instruction codes executable by a computer such as a program module executed by the computer.

Besides, the data structure in accordance with the embodiment of the present invention can be stored in the storage medium executable by the computer.

A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

The system and method of the present invention has been explained in relation to a specific embodiment, but its components or a part or all of its operation can be embodied by using a computer system having general-purpose hardware architecture.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention.

The scope of the present invention is defined by the following claims rather than by the detailed description of the embodiment. It shall be understood that all modifications and embodiments conceived from the meaning and scope of the claims and their equivalents are included in the scope of the present invention.

The invention claimed is:

1. A system to generate a recommendation keyword, the system comprising:
    a processor;
    a storage device including a plurality of units for generating a recommendation keyword, said units comprising:
    a classifying unit, executed by the processor, configured to receive search keywords transmitted during a broadcast time period of a content from a plurality of user terminals to a search engine and to classify users as viewers of the content by analyzing the search keywords entered by the users and transmitted from the plurality of user terminals with respect to both: (i) previously stored seed keywords relevant to the content and (ii) the broadcast time period of the content, wherein the storage device is configured to store the seed keywords; and
    a collection unit for collecting search keywords that were both: (i) entered by the users classified as viewers of the content, as determined by the classifying unit, and (ii) entered during a predetermined time period that includes the broadcast time period of the content,
    a recommendation keyword generating unit configured to select keywords having a higher correlation with the content than a threshold value and to generate a keyword set comprising recommendation keywords related to the content, the keyword set being based on the search keywords collected by the collection unit, wherein the number of classified users is less than the number of users that entered each keyword, and
    wherein the recommendation keywords are provided to users during a subsequent broadcast related to the content.

2. The system of claim 1, further comprising:
a content-keyword time synchronizing unit,
wherein the content is associated with at least one play time period, and
wherein the content-keyword time synchronizing unit is configured to generate recommendation keywords for each play time period of the content, based on a number of inputs of keywords of the keyword set.

3. The system of claim 2, wherein the content-keyword time synchronizing unit is configured to remove an irrelevant keyword from among the keywords of the keyword set.

4. The system of claim 2, wherein the content-keyword time synchronizing unit is configured to synchronize the recommendation keywords for each play time period of the content with a broadcast time period of the content.

5. The system of claim 1, wherein:
the generated keyword set is also based on user IDs of the classified users; and
the user IDs of the users are stored in association with the content.

6. The system of claim 1, wherein the classifying unit is configured to classify users in response to detection of the user's input of the seed keyword that is a threshold number of times or more during a time period comprising the broadcast time period.

7. The system of claim 1, wherein the recommendation keyword generating unit is configured to generate the keyword set by using a ratio of a number of inputs of a specific keyword by the respective users to a total number of keywords input by the respective users.

8. The system of claim 7, wherein the recommendation keyword generating unit is configured to generate the keyword set by using a number of users who input the specific keyword.

9. The system of claim 7, wherein the recommendation keyword generating unit is configured to generate the keyword set by using a ratio of a number of inputs of the specific keyword during the broadcast time period to a number of the keyword inputs during a threshold time, the threshold time being longer than the broadcast time period.

10. The system of claim 1, wherein the classifying unit is configured to classify users by classifying the users who inputted the seed keywords a preset number of times or more.

11. A computer-implemented method for generating a recommendation keyword, the method comprising:
classifying, using a processor, a prospective viewer of a content as a viewer of the content, out of a larger group of users, by analyzing search keywords entered by the prospective viewers and transmitted during a broadcast time period of a content from a plurality of user terminals of the prospective viewers to a search engine with respect to both: (i) seed keywords and (ii) the broadcast time period of the content, wherein the seed keywords have been previously stored in a storage device, the seed keywords being related to the content broadcasted during the broadcast time period;
collecting search keywords that were both: (i) entered by the users classified as viewers of the content, as determined via the classifying, and (ii) entered during a predetermined time period that includes the broadcast time period of the content, and
generating, using the processor, a keyword set comprising recommendation keywords by selecting keywords having a higher correlation with the content than a threshold value, wherein the keywords are synchronized with the content and are based on the collected search keywords,
wherein the recommendation keywords are provided to a monitor of a user device during a subsequent broadcast related to the content.

12. The method of claim 11, further comprising:
generating at least one recommendation keyword for at least one play time of the broadcast time period from the keyword set by using a number of keyword inputs during each play time period; and
storing the recommendation keyword corresponding to the each play time period.

13. The method of claim 11, wherein classifying a prospective viewer comprises classifying a user by determining input search word transmitted from the prospective viewer, the input search word comprising a seed keyword detected by number of threshold times during the broadcast time period.

14. The method of claim 11, further comprising:
classifying a prospective viewer, in response to a determination that a total value is greater than a threshold value of the seed keywords,
wherein the total value comprises the sum of the weighted values of the seed keywords input by the user, and
wherein the seed keywords are classified into categories having different weighted values.

15. The method of claim 11, wherein the keyword set is generated by using a ratio of a number of keyword inputs by the prospective viewer to a number of keyword inputs by a non-prospective viewer.

16. The method of claim 15, wherein the keyword set is generated by using a number of keyword inputs of prospective viewers.

17. The method of claim 16, wherein the keyword inputs of the prospective viewers comprise a number of the seed keywords of the prospective viewers.

18. The method of claim 15, wherein the keyword set is generated by further using a number of keyword inputs during a time period comprising the broadcast time.

19. The method of claim 12, wherein the recommendation keyword for each play time period is generated by dividing the broadcast time period into play time periods and by using a number of keyword inputs or a rank of the number of keyword inputs.

20. A non-transitory computer readable medium comprising an executable program which, when executed, by a processor, performs the steps of:
classifying a prospective viewer of a content as a viewer of the content, out of a larger group of users, by analyzing search keywords entered by the prospective viewers and transmitted during a broadcast time period of a content from a plurality of user terminals of the prospective viewers to a search engine, with respect to both: (i) seed keywords and (ii) the broadcast time period of the content, wherein the seed keywords have been previously stored, the seed keywords being related to the content broadcasted during the broadcast time period;
collecting search keywords that were both: (i) entered by the users classified as viewers of the content, as determined via the classifying, and (ii) entered during a predetermined time period that includes the broadcast time period of the content, and
generating a keyword set comprising recommendation keywords by selecting keywords having a higher correlation with the content than a threshold value, wherein the keywords are synchronized with the content and are based on the collected search keywords, and
wherein the recommendation keywords are provided to users during a subsequent broadcast related to the content.

21. A server comprising a non-transitory storage medium in which a data structure stored which is executed by a processor, the server comprising:
- a content identifying module configured to receive search keywords entered by users and transmitted during a broadcast time period of a content from a plurality of respective user terminals to a search engine and to classify users as viewers of the content, from the larger group of users, by analyzing the search keywords transmitted from the plurality of user terminals with respect to both: (i) previously stored seed keywords relevant to the content and (ii) the broadcast time period of the content,
- a collection module for collecting search keywords that were both: (i) entered by the users classified as viewers of the content, as determined by the content identifying module, and (ii) entered during a predetermined time period that includes the broadcast time period of the content,
- wherein the collected search keywords that have a higher correlation with the content than a threshold value are selected and provided by synchronizing the content with the selected search keywords as keyword data,
- wherein the keyword data is provided to users during a subsequent broadcast related to the content.

* * * * *